United States Patent [19]

Urban et al.

[11] Patent Number: 4,623,936
[45] Date of Patent: Nov. 18, 1986

[54] ERROR PROCESSING TECHNIQUE FOR MODIFIED READ CODE

[75] Inventors: Stephen J. Urban, Huntingdon Valley, Pa.; Charles D. Bodson, Arlington, Va.

[73] Assignee: The United States of America as represented by the Secretary of the Army, Washington, D.C.

[21] Appl. No.: 780,751

[22] Filed: Sep. 27, 1985

[51] Int. Cl.$^4$ .............................................. H04N 1/40
[52] U.S. Cl. .................................. 358/284; 358/280; 371/31
[58] Field of Search ............... 358/260, 261, 263, 280, 358/259, 284; 371/31

[56] References Cited

U.S. PATENT DOCUMENTS 4,491,149  5/1984  Ogawa .............................. 358/280

Primary Examiner—Howard W. Britton
Attorney, Agent, or Firm—John H. Raubitschek; Francis A. Cooch; Werten F. W. Bellamy

[57] ABSTRACT

A method of error processing is disclosed in which the first erroneous line detected in a facsimile transmission is decoded, and printed in the normal manner, up to the point in the line where an error is detected. An erroneous portion of the line is then defined to be the point in the line from which the error is detected as well as four color changes to the left. This erroneous portion is replaced by the corresponding picture elements in the immediately preceding line. The resulting "corrected" line is then used as a new "previous line" and the process is repeated with the erroneous portion of each subsequent line being replaced with white until a full line is properly decoded.

9 Claims, 8 Drawing Figures

1.'ordre de lancement et de réalisation des applications fait l'objet de décisions au plus haut niveau de la Direction Générale des Télécommunications. Il n'est certes pas question de construire ce système intégré "en bloc" mais bien au contraire de procéder par étapes, par paliers successifs. Certaines applications, dont la rentabilité ne pourra être assurée, ne seront pas entreprises. Actuellement, sur trente applications qui ont pu être globalement définies, six en sont au stade de l'exploitation, six autres se sont vu donner la priorité pour leur réalisation.

Chaque application est confiée à un "chef de projet", responsable successivement de sa conception, de son analyse-programmation et de sa mise en œuvre dans une région-pilote. La généralisation ultérieure de l'application réalisée dans cette région-pilote dépend des résultats obtenus et fait l'objet d'une décision de la Direction Générale. Néanmoins, le chef de projet doit dès le départ considérer que son activité a une vocation nationale donc refuser tout particularisme régional. Il est aidé d'une équipe d'analystes-programmeurs et entouré d'un "groupe de conception" chargé de rédiger le document de "définition des objectifs globaux" puis le "cahier des charges" de l'application, qui sont adressés pour avis à tous les services utilisateurs potentiels et aux chefs de projet des autres applications. Le groupe de conception comprend 5 à 10 personnes représentant les services les plus divers concernés par le projet, et comporte obligatoirement un bon analyste attaché à l'application.

II - L'IMPLANTATION GEOGRAPHIQUE D'UN RESEAU INFORMATIQUE PERFORMANT

L'organisation de l'entreprise française des télécommunications repose sur l'existence de 20 régions. Des calculateurs ont été implantés dans le passé au moins dans toutes les plus importantes. On trouve ainsi des machines Bull Gamma 30 à Lyon et Marseille, des GE 425 à Lille, Bordeaux, Toulouse et Montpellier, un GE 437 à Massy, enfin quelques machines Bull 300 TI à programmes câblés étaient récemment ou sont encore en service dans les régions de Nancy, Nantes, Limoges, Poitiers et Rouen ; ce parc est essentiellement utilisé pour la comptabilité téléphonique.

A l'avenir, si la plupart des fichiers nécessaires aux applications décrites plus haut peuvent être gérés en temps différé, un certain nombre d'entre eux devront nécessairement être accessibles, voire mis à jour en temps réel : parmi ces derniers le fichier commercial des abonnés, le fichier des renseignements, le fichier des circuits, le fichier technique des abonnés contiendront des quantités considérables d'informations.

Le volume total de ces fichiers à gérer en place finale sur un ordinateur ayant en charge quelques 500 000 abonnés a été estimé à un milliard de caractères au moins. Au moins le tiers des données seront concernées par des traitements en temps réel.

Aucun des calculateurs énumérés plus haut ne permettait d'envisager de tels traitements.

L'intégration progressive de toutes les applications suppose la création d'un support commun pour toutes les informations, une véritable "Banque de données", répartie sur des moyens de traitement nationaux et régionaux, et qui devra rester alimentée, mise à jour en permanence, à partir de la base de l'entreprise, c'est-à-dire les chantiers, les magasins, les guichets des services d'abonnement, les services de personnel etc.

L'étude des différents fichiers à constituer a donc permis de définir les principales caractéristiques du réseau d'ordinateurs nouveaux à mettre en place pour aborder la réalisation du système informatif. L'obligation de faire appel à ces ordinateurs de troisième génération, très puissants et dotés de volumineuses mémoires de masse, a conduit à en réduire substantiellement le nombre.

L'implantation de sept centres de calcul interrégionaux constituera un compromis entre : d'une part le désir de réduire le coût économique de l'ensemble, de faciliter la coordination des équipes d'informaticiens; et d'autre part le refus de créer des centres trop importants, difficiles à gérer et à diriger, et posant des problèmes délicats de sécurité. Le regroupement des traitements relatifs à plusieurs régions sur chacun de ces sept centres permettra de leur donner une taille relativement homogène. Chaque centre "gèrera" environ un million d'abonnés à la fin du VIème Plan.

La mise en place de ces centres a débuté au début de l'année 1971 : un ordinateur IRIS 50 de la Compagnie Internationale pour l'Informatique a été installé à Toulouse en février ; la même machine vient d'être mise en service au centre de calcul interrégional de Bordeaux.

Print white (PW) error processing: MR code.

FIG. 1 l'ordre de lancement et de réalisation des applications fait l'objet de décisions au plus haut niveau de la Direction Générale des Télécommunications. Il n'est certes pas question de construire ce système intégré "en bloc" mais bien au contraire de procéder par étapes, par paliers successifs. Certaines applications, dont la rentabilité ne pourra être assurée, ne seront pas entreprises. Actuellement, sur trente applications qui ont pu être globalement définies, six en sont au stade de l'exploitation, six autres se sont vu donner la priorité pour leur réalisation.

Chaque application est confiée à un "chef de projet", responsable successivement de sa conception, de son analyse-programmation et de sa mise en œuvre dans une région-pilote. La généralisation ultérieure de l'application réalisée dans cette région-pilote dépend des résultats obtenus et fait l'objet d'une décision de la Direction Générale. Néanmoins, le chef de projet doit dès le départ considérer que son activité a une vocation nationale donc refuser tout particularisme régional. Il est aidé d'une équipe d'analystes-programmeurs et entouré d'un "groupe de conception" chargé de rédiger le document de "définition des objectifs finaux" puis le "cahier des charges" de l'application, qui sont adressés pour avis à tous les services utilisateurs potentiels et aux chefs de projet des autres applications. Le groupe de conception comprend 8 à 10 personnes représentant les services les plus divers concernés par le projet, et comporte obligatoirement un bon analyste attaché à l'application.

II - L'IMPLANTATION GEOGRAPHIQUE D'UN RESEAU INFORMATIQUE PERFORMANT

L'organisation de l'entreprise française des télécommunications repose sur l'existence de 20 régions. Des calculateurs ont été implantés dans le passé au moins dans toutes les plus importantes. On trouve ainsi des machines Bull Gamma 30 à Lyon et Marseille, des GE 425 à Lille, Bordeaux, Toulouse et Montpellier, un GE 437 à Massy, enfin quelques machines Bull 300 TI à programmes câblés étaient récemment ou sont encore en service dans les régions de Nancy, Nantes, Limoges, Poitiers et Rouen ; ce parc est essentiellement utilisé pour la comptabilité téléphonique.

A l'avenir, si la plupart des fichiers nécessaires aux applications décrites plus haut peuvent être gérés en temps différé, un certain nombre d'entre eux devront nécessairement être accessibles, voire mis à jour en temps réel : parmi ces derniers le fichier commercial des abonnés, le fichier des renseignements, le fichier des circuits, le fichier technique des abonnés contiendront des quantités considérables d'informations.

Le volume total de caractères à gérer en phase finale sur un ordinateur ayant en charge quelques 500 000 abonnés a été estimé à un milliard de caractères au moins. Au moins le tiers des données seront concernées par des traitements en temps réel.

Aucun des calculateurs énumérés plus haut ne permettait d'envisager de tels traitements.

L'intégration progressive de toutes les applications suppose la création d'un support commun pour toutes les informations, une véritable "Banque de données", répartie sur des moyens de traitement nationaux et régionaux, et qui devra rester alimentée, mise à jour en permanence, à partir de la base de l'entreprise, c'est-à-dire les chantiers, les magasins, les guichets des services d'abonnement, les services de personnel etc.

L'étude des différents fichiers à constituer a donc permis de définir les principales caractéristiques du réseau d'ordinateurs nouveaux à mettre en place pour aborder la réalisation du système informatif. L'obligation de faire appel à des ordinateurs de troisième génération, très puissants et dotés de volumineuses mémoires de masse, a conduit à en réduire substantiellement le nombre.

L'implantation de sept centres de calcul interrégionaux constituera un compromis entre : d'une part le désir de réduire le coût économique de l'ensemble, de faciliter la coordination des équipes d'informaticiens; et d'autre part le refus de créer des centres trop importants difficiles à gérer et à diriger, et posant des problèmes délicats de sécurité. Le regroupement des traitements relatifs à plusieurs régions sur chacun de ces sept centres permettra de leur donner une taille relativement homogène. Chaque centre "gérera" environ un million d'abonnés à la fin du VIème Plan.

La mise en place de ces centres a débuté au début de l'année 1971 : un ordinateur IRIS 50 de la Compagnie Internationale pour l'Informatique a été installé à Toulouse en février ; la même machine vient d'être mise en service au centre de calcul interrégional de Bordeaux.

Print previous line (PPL) error processing; MR code.

L'ordre de lancement et de réalisation des applications fait l'objet de décisions au plus haut
niveau de la Direction Générale des Télécommunications. Il n'est certes pas question de
construire ce système intégré "en bloc" mais bien au contraire de procéder par étapes, par
paliers successifs. Certaines applications, dont la rentabilité ne pourra être assurée, ne
seront pas entreprises. Actuellement, sur trente applications qui ont pu être globalement
définies, six en sont au stade de l'exploitation, six autres se sont vu donner la priorité pour
leur réalisation.
Chaque application est confiée à un "chef de projet", responsable successivement de sa
conception, de son analyse-programmation et de sa mise en œuvre dans une région-pilote.
La généralisation ultérieure de l'application réalisée dans cette région-pilote dépend des
résultats obtenus et fait l'objet d'une décision de la Direction Générale. Néanmoins, le
chef de projet doit dès le départ considérer que son activité a une vocation nationale donc
refuser tout particularisme régional. Il est aidé d'une équipe d'analystes-programmeurs
et entouré d'un "groupe de conception" chargé de rédiger le document de "définition des
objectifs globaux" puis le "cahier des charges" de l'application, qui sont adressés pour avis
à tous les services utilisateurs potentiels et aux chefs de projet des autres applications.
Le groupe de conception comprend 6 à 10 personnes représentant les services les plus
divers concernés par le projet, et comporte obligatoirement un bon analyste attaché à l'ap-
plication.

II - L'IMPLANTATION GÉOGRAPHIQUE D'UN RÉSEAU INFORMATIQUE PERFORMANT

L'organisation de l'entreprise française des télécommunications repose sur l'existence de
20 régions. Des calculateurs ont été implantés dans le passé au moins dans toutes les plus
importantes. On trouve ainsi des machines Bull Gamma 30 à Lyon et Marseille, des GE 425
à Lille, Bordeaux, Toulouse et Montpellier, un GE 437 à Massy, enfin quelques machines
Bull 300 TI à programmes câblés étaient récemment ou sont encore en service dans les
régions de Nancy, Nantes, Limoges, Poitiers et Rouen ; ce parc est essentiellement utilisé
pour la comptabilité téléphonique.
A l'avenir, si la plupart des fichiers nécessaires aux applications décrites plus haut peuvent
être gérés en temps différé, un certain nombre d'entre eux devront nécessairement être ac-
cessibles, voire mis à jour en temps réel : parmi ces derniers le fichier commercial des
abonnés, le fichier des renseignements, le fichier des circuits, le fichier technique des
abonnés contiendront des quantités considérables d'informations.
Le volume total de caractères à gérer en phase finale sur un ordinateur ayant en charge
quelques 500.000 abonnés représenterait au milliard de caractères au moins. Au moins le
tiers des données seront concernées par des traitements en temps réel.
Aucun des calculateurs énumérés plus haut ne permettait d'envisager de tels traitements.
L'intégration progressive de toutes les applications suppose la création d'un support commun
pour toutes les informations, une véritable "Banque de données", répartie sur des moyens
de traitement nationaux et régionaux, et qui devra rester alimentée, mise à jour en perma-
nence, à partir de la base de l'entreprise, c'est-à-dire les chantiers, les magasins, les
guichets des services d'abonnement, les services de personnel etc.
L'étude des différents fichiers à constituer a donc permis de définir les principales carac-
téristiques du réseau d'ordinateurs nouveau à mettre en place pour aborder la réalisation
du système informatif. L'obligation de faire appel à des ordinateurs de troisième génération,
très puissants et dotés de volumineuses mémoires de masse, a conduit à en réduire substan-
tiellement le nombre.
L'implantation de sept centres de calcul interrégionaux constituera un compromis entre :
d'une part le désir de réduire le coût économique de l'ensemble, de faciliter la coordination
des équipes d'informaticiens; et d'autre part le refus de créer des centres trop importants
difficiles à gérer et à diriger, et posant des problèmes délicats de sécurité. Le regroupe-
ment des traitements relatifs à plusieurs régions sur chacun de ces sept centres permettra
de leur donner une taille relativement homogène. Chaque centre "gérera" environ un mil-
lion d'abonnés à la fin du VIème Plan.
La mise en place de ces centres a débuté au début de l'année 1971 : un ordinateur IRIS 50 de
la Compagnie Internationale pour l'Informatique a été installé à Toulouse en février ; la
même machine vient d'être mise en service au centre de calcul interrégional de Bordeaux.

Normal decode/previous line (NDPL) error processing; MR
code.

FIG. 4

ERROR PROCESSING TECHNIQUE FOR MODIFIED READ CODE

BACKGROUND OF THE INVENTION

1. Field of the Invention

The present invention relates to an error correction method and apparatus for minimizing the subjective effects of errors in facsimile transmission.

2. Discussion of Related Art

In facsimile transmission, sequences of picture elements are transmitted in coded form. The code words may have different lengths and no ambiguous beginning or end marking. The code words are transmitted in succession with coded end of line (EOL) designations transmitted after each group of code words representing a printed line of picture elements. Each line contains a predetermined number of elements. For example, the present standard is 1728 picture elements per line.

The problem of detecting and correcting for the effects of errors in transmitted picture elements (pels) is significant. When an error occurs in one picture element of a line, all of the following picture elements in that line can be affected. This problem is compounded by two-dimensional coding techniques which are presently used to reduce transmission time. This is a line-by-line coding method in which the position of each changing picture element on the current or coding line is coded with respect to the position of the corresponding reference element situated on either the coding line or the reference line which lies immediately above the coding line. After the coding line has been coded, it becomes the reference line for the next coding line. In this connection, a changing element is defined as an element whose "color" (i.e. black or white) is different from that of the previous element along the same scan line.

Conventionally, a one-dimensional line is first transmitted. This is a line of data composed of a series of variable length code words. Each code word represents a run length of either all white or all black. White run lengths and black run lengths alternate. The white and black run lengths are unambiguously coded based on a predetermined code.

The one-dimensional code line then acts as a reference for the first two-dimensional coding line. This line then acts as a reference for the second two-dimensional coding line and so on. Accordingly, it can be seen that if an error occurs in any one line, the following two-dimensional lines will also be in error. In order to limit this successive error generation, a one-dimensional line is used as every, for example, fourth transmitted line. Thus, an error generated in any one line will extend to a maximum of four lines in total.

There are four alternative error processing techniques currently being used. In each, an erroneous line is determined either when no word in the applicable code table matches a particular received bit pattern, or if the decoded signals are not exactly 1728 pels per line. In this latter case, an EOL occurs before 1728 pels have written, or more than 1728 pels are written before the EOL is decoded.

In one error coding technique, the first erroneous line is printed white, and all subsequent lines are printed white until a one-dimensional line is correctly decoded. In the following discussion this technique will be referred to as print white or PW.

A second technique comprises replacing the first erroneous line (X) by the previous correctly received line (X-1), and replacing all subsequent lines by X-1 until a one-dimensional line is correctly coded. In the following discussion, this technique will be referred to as the print previous line or PPL technique.

The third error processing technique is referred to as print previous line/white or PLW. This technique is a combination of the previous two. The first erroneous line (X) is replaced by the previous correctly received line (X-1), and all subsequent lines are printed white until a one-dimensional line is correctly decoded.

The fourth error processing technique is known as normal decode/previous line or NDPL. In this case, the first erroneous line is decoded and printed in the normal manner up to the point where the error is detected. This point on the remainder of the first erroneous line is replaced by the corresponding picture elements in the "previous line". The resulting "corrected" line is then used as the new "previous line" and the process is repeated until a one-dimensional line is correctly decoded.

Figure 3:
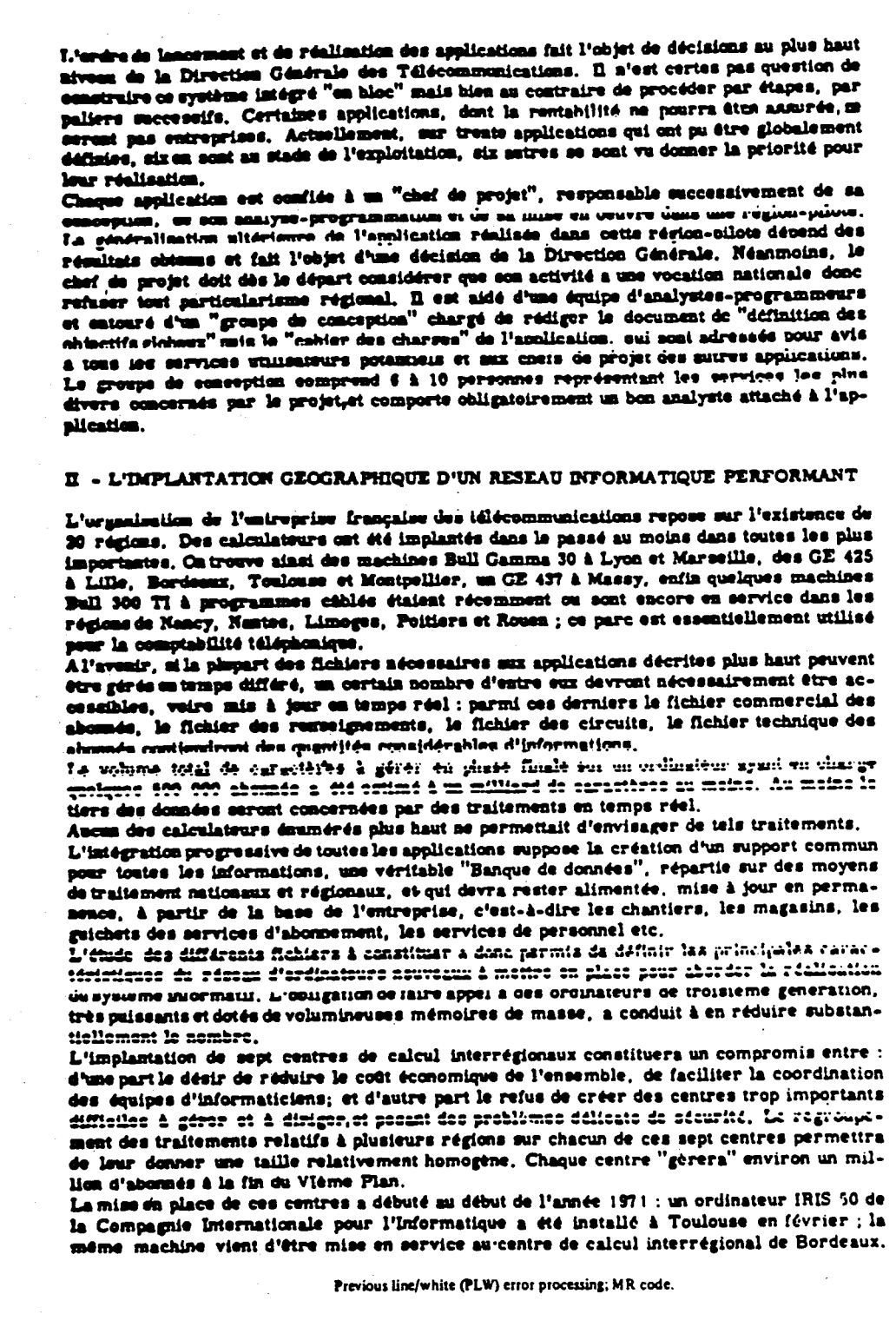

FIGS. 1–4 show, respectively, four output documents which were transmitted with the same error set but were operated on using PW, PPL, PLW and NDPL error processing techniques, respectively.

A slight but definite improvement in legibility and quality of PLW can be seen in FIG. 4 relative to PW in FIG. 1. This is caused by the use of the previous line for the first erroneous line, which is obviously a superior substitution over all white.

Comparing PPL to PLW, it can be seen that the quality of PPL is superior since the occurrence of error streaks has been greatly reduced. On the other hand, the "quality" in particular areas, such as the 10th and 15th lines of the text has been reduced due to the creation of new error artifacts. Furthermore, it is not at all clear that the legibility of the text has been improved by the repetition of the previous correct line in PPL. In general, it would appear that the human observer could read the text better with the PLW technique.

The NDPL technique used to generate FIG. 4 shows a marked improvement in "legibility" relative to the other processing techniques. This is most striking when one compares the 7th line of the text from the bottom of the page for the PLW and NDPL techniques. Although the "legibility" has improved significantly, the black streaks have a negative impact on the image "quality".

SUMMARY OF THE INVENTION

One object of the present invention is to provide a method and apparatus for carrying out an error processing technique which results in a reproduced image being superior in both legibility and image quality.

Another object of the present invention is to provide an error processing technique in which the occurrence of black streaks due to the presence of errors is reduced to a minimum.

A further object of the present invention is to provide an error processing technique which is compatible with a Group 3 facsimile transmission encoded by means of the Modified Read Code (MRC).

In accordance with the above and other objects, the present invention is a method and apparatus for carrying out an error processing technique which improves the legibility of a document transmitted over a noisy channel with Group 3 facsimile equipment. According to the technique, the first erroneous line is decoded, and printed in the normal manner up to the point in the line where the error is detected. From this point on, the remainder of the first erroneous line is replaced by the corresponding picture elements in the "previous line". The resultant "corrected" line is then used as the new "previous line", and the process is repeated with the erroneous portion of any subsequent line being replaced by white, until a one-dimensional line is correctly decoded. In order to minimize black streaks in the erroneous part of the line, the point at which the error is found is redefined to be four color changes to the left.

BRIEF DESCRIPTION OF THE DRAWINGS

The above and other objects of the present invention will become more readily apparent as the invention is more clearly understood from the detailed description below, reference being had to the accompanying drawings in which like reference numerals represent like parts throughout, and in which:

FIG. 1 shows a page of text corrected using a prior art print white error processing technique;

FIG. 2 shows the same page of text as in FIG. 1 but processed using a print previous line error processing technique;

FIG. 3 shows the same page of text as in FIGS. 1 and 2 but processed using a previous line/white error processing technique;

FIG. 4 shows the same page of text as in FIGS. 1-3 except processed using a normal decode/previous line error processing technique;

DETAILED DESCRIPTION OF THE PREFERRED EMBODIMENT

Figure 5:
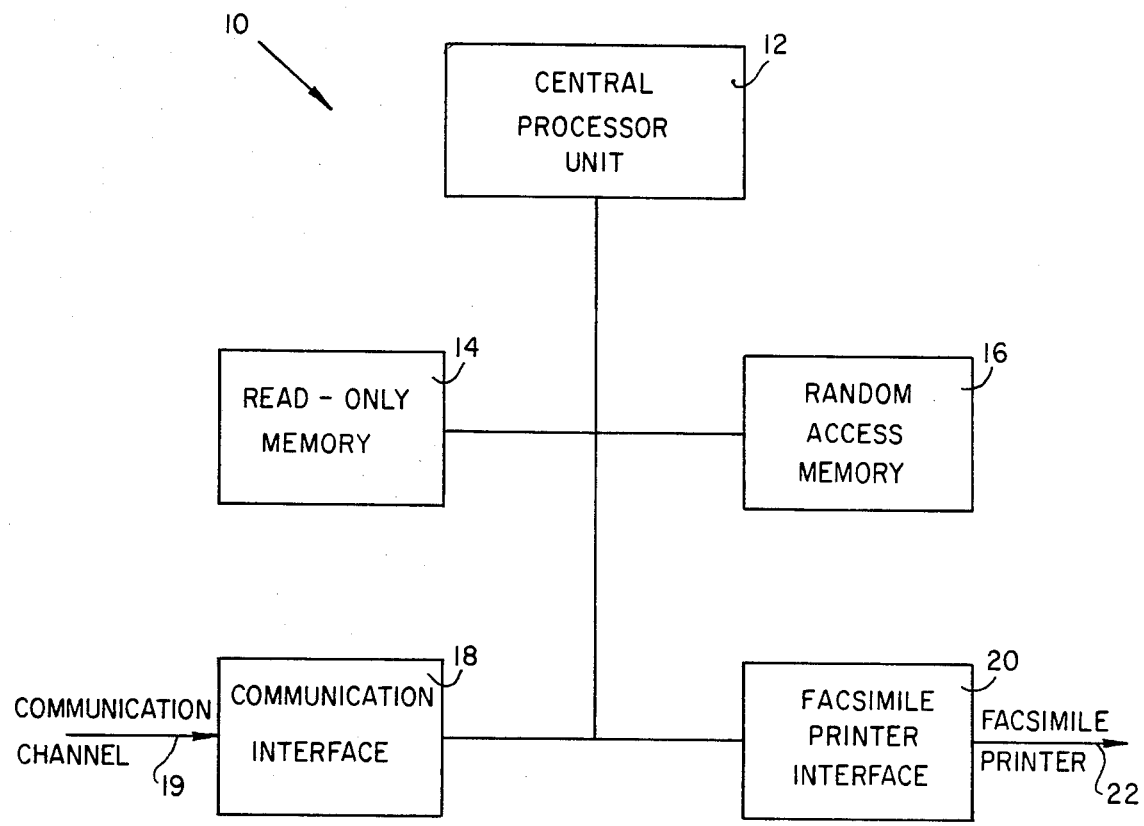
FIG. 5 shows a block diagram of the present invention.

With reference to FIG. 5, a block diagram is shown of a preferred embodiment of a digital facsimile receiver system 10 incorporating the error processing system of the present invention. It should be understood that a wide range of approaches can be taken in implementing the present invention including both a hardware approach and the microprocessor approach specifically illustrated in FIG. 5.

The system of FIG. 5 includes a central processing unit 12 which has access to a read only memory 14 and a random access memory 16. A communication interface 18 connects the central processing unit 12 to a communication channel 19 and a facsimile printer interface 20 connects the central processing unit to a facsimile printer through a line 22.

A total of 2300 scan lines per page are typically received and typical transmission links include the public switched telephone network, which can be the communication channel 19. The communication interface 18 is typically a modem and central processing unit 12 may be Motorola M68000 microprocessor. Typically, the central processing unit 12 would be part of a microcomputer which also contains 64K bytes of RAM 16 and 64K bytes of ROM 14. The facsimile printer interface 20 is a conventional component.

In operation, in a typical facsimile system, a single scan line consists of 1728 picture elements. As each scan line is decompressed by the central processing unit, the scan line is stored in the random access memory 16 and is used as a reference to decompress the next compressed line. Read only memory 14 contains the decompression and error processing algorithms which operate on the two line storage in random access memory 16. Once the decompression and error processing are complete, the information is passed to facsimile printer interface 20. For purposes of the present invention, the read only memory 14 and the random access memory 16 do not need to have 64K bytes of storage. The storage in random access memory 16 only needs to be adequate to store two lines of data together with sufficient storage to accommodate the error processing program. The read only memory should be sufficiently large to store the error processing program. 64K bytes are more than ample for this purpose.

Figure 6:
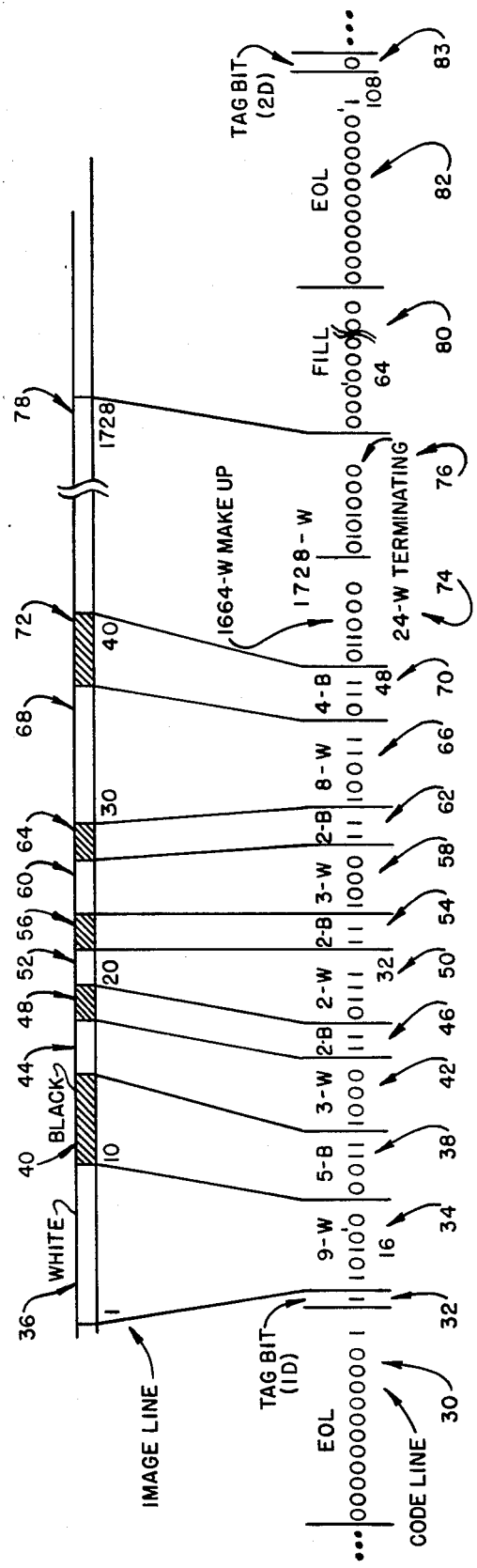
FIG. 6 shows a typical coded line of picture elements.

FIG. 6 shows a sample line of a Modified Read Code. The first item shown in FIG. 6 is an end of line (EOL) code 30 indicating the end of the previous line. Tag bit 32 identifies the present line as a one-dimensional line. Accordingly, each of the codes in the line corresponds to a set number of white or black spaces to be printed. The next code 34 indicates nine white spaces which are shown printed at 36. Next, five black spaces are indicated by the code shown at 38. These black spaces shown are printed at 40. Next, the code in section 42 indicates three white spaces shown printed at 44. The code in section 46 indicates two black spaces shown printed at 48. The code in section 50 indicates two white spaces shown printed at 52. The code in section 54 indicates two black spaces shown printed at 56. The code in section 58 indicates three white spaces shown printed at 60. The code in section 62 indicates two black spaces shown printed at 64. The code in section 66 indicates eight white spaces shown printed at 68. The code in section 70 indicates four black spaces shown printed at 72. Finally, 1688 white picture elements are transmitted to complete the line. Standard coding procedure calls for any run length greater than 64 picture elements to be transmitted using a "make-up code" followed by a "terminating code". In this case, code 74 represents a make-up code of 1664 white elements and code 76 represents 24 white elements giving a total of 1688 white elements which are shown at 78. This completes the data for one line since the total picture elements is now 1728. Fill 80 may then be transmitted and EOL code 82 is transmitted to show that the line is completed. Fill 80 comprises a string of zeros and may be placed in the message flow to create a pause. The fill ensures that the transmission time of data, fill and EOL is not less than the minimum transmission time of the total coded scan line established in a pre-message control procedure. The EOL code 82 is followed by a tag bit code 83 indicating that the next line is a two-dimensional line.

It will be understood that all of the coding procedures are conventional for Modified Read Code established for Group 3 apparatus by the CCITT and do not constitute part of the present invention.

Figure 7:
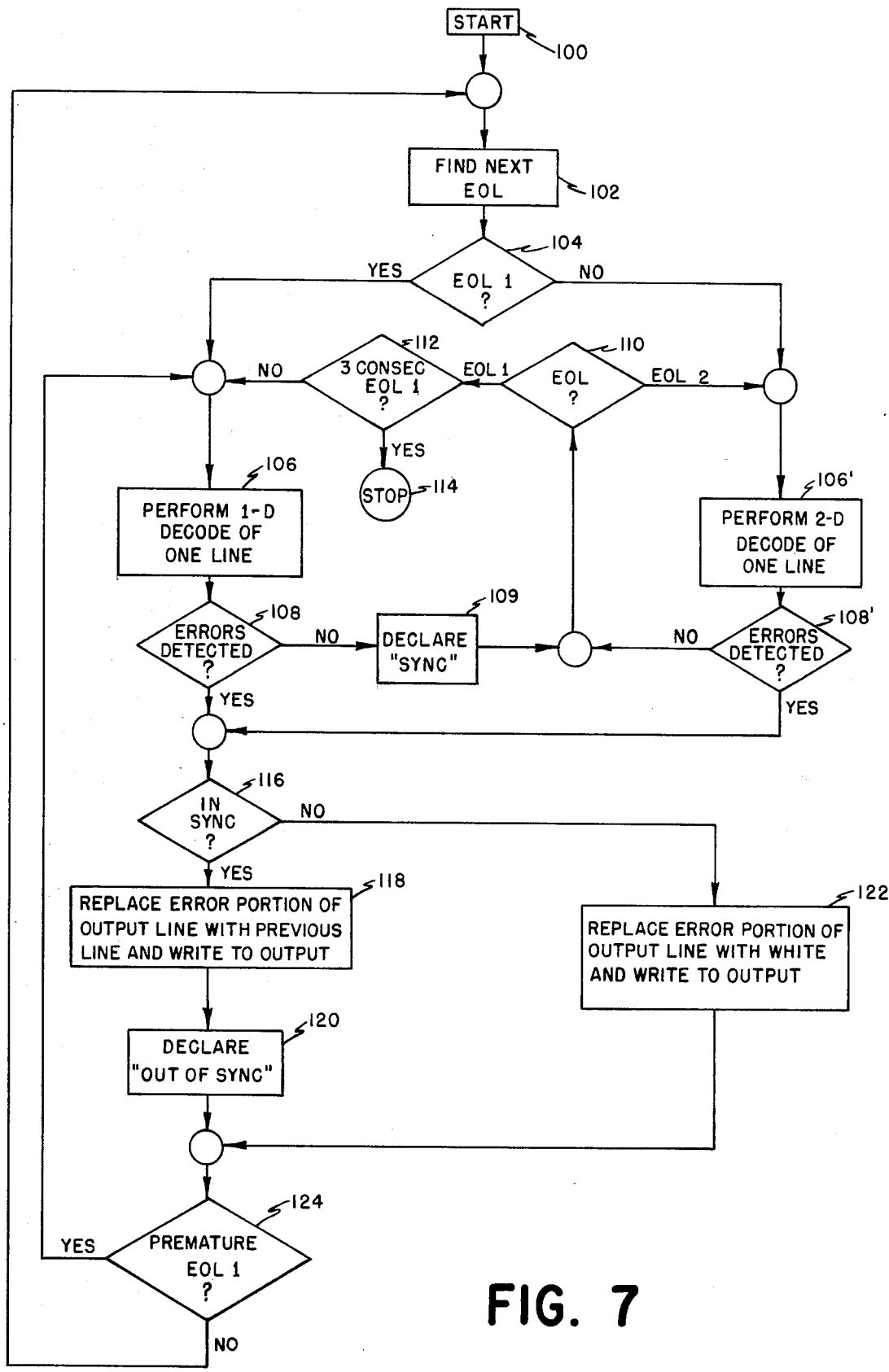
FIG. 7 shows a flow chart for carrying out the present invention.

FIG. 7 shows a flow chart of the error processing program to be stored in read only memory 14. The program starts at step 100 where any initialization, etc. takes place. Control then passes to step 102 where the next EOL code is located. This corresponds to code 30 in FIG. 6. The tag bit 32 following the EOL code is then read in step 104 to determine whether the subsequent line is a one-dimensional coded line or a two-dimensional coded line. If the line is one-dimensional, control passes to step 106 where a one dimensional decoding and error processing routine, to be discussed below, is carried out.

If the tag bit indicates a two-dimensional line, control passes to step 106' where a two-dimensional decoding and error processing routine is carried out.

From step 106, control passes to decision block 108 where it is determined whether errors were detected in block 106. If no errors were detected, a flag is set in block 109 indicating synchronization and control passes to block 110. Similarly, for a two-dimensional line, control passes from block 106' to block 108' where it is determined whether any errors were detected in block 106'. If no errors were detected, control passes to step 110.

In step 110, the tag bit following the next EOL is read to determine whether the following line is one-dimensional or two-dimensional. If the tag bit indicates a one-dimensional line, control passes to block 112 where a determination is made as to whether the following codes are two additional EOL codes followed by "one" tag bits. If the answer is yes, this indicates that transmission is over and the program stops at 114. Otherwise, control returns to block 106 where the next line is decoded and processed for errors.

If the decision in block 110 indicates that the following line is a two-dimensional line, control returns to block 106' where the line is decoded and processed for errors. If the decision in step 108 or 108' indicates that errors have been located, control passes to step 116 where it is determined whether the synchronization flag has been set or not. If the synchronization flag has been set, this indicates that the previous line was properly decoded and control passes to step 118 where the error portion of the output line is replaced with the corresponding portion of the previous output line and the line is written to the output. Control then passes to step 120 where the synchronization flag is reset to indicate lack of synchronization.

In step 116, if the synchronization flag is reset, this indicates that the previous line also has an error. In this case, control passes to step 122 where the error portion of the output line is replaced with white and the completed line is then written to the output.

It will be noted that steps 118 and 120 require that the error portion of the output line be defined as being four color changes to the left of the point where the actual error has been detected. This feature of the invention will be discussed further below.

From step 120, control passes to step 124 where it is determined whether or not the error causing the "yes" response at step 108 was a premature EOL followed by a "one" code indicating a following one-dimensional line. If the answer is "yes", control passes directly to step 106 where the subsequent line is decoded. Otherwise, control passes to step 102 where the next EOL code is found.

Figure 8:
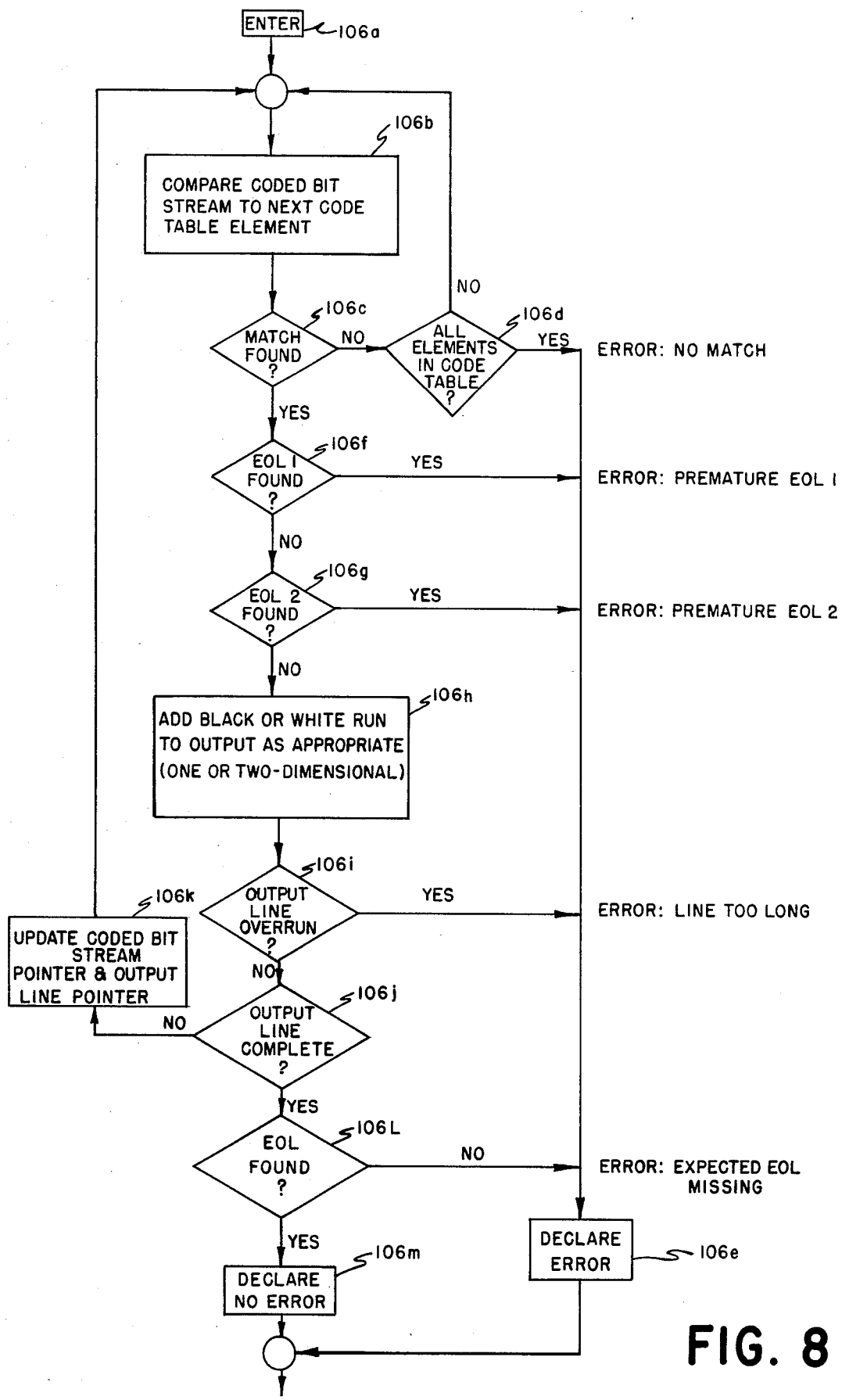
FIG. 8 shows an expanded flow chart of the decode blocks of FIG. 7.

The program of FIG. 8 can be used either at step 106 or at step 106'. This program is entered at step 106A and control passes to step 106D where the coded bit stream to be decoded is compared to one entry of the applicable code table. In step 106C a decision is made as to whether a match was found. If no match was found, control passes to step 106D where it is determined whether all of the elements of the code table have been checked. If not, control returns to step 106B where the next element of the code table is compared. This process repeats itself until all elements of the code table have been checked. If no match is found, control passes from step 106D to step 106E where an error is declared by setting an error flag.

If a match is found in step 106C, control passes to step 106F where it is determined whether the match is an end of line followed by a tag bit indicating a one-dimensional line. If this is the case, control passes to step 106E where an error is declared. The error is a premature end of line 1. If no error is found at step 106F, control passes to step 106G where it is determined whether the matched code is an end of line code followed by a two-dimensional line code. If it is, control passes to step 106E where an error is declared. If not, control passes to step 106H where the appropriate number of black or white picture elements are output as appropriate. Control then passes to line 106I where it is determined whether greater than 1728 pels have been output. If the answer is yes, the line is too long and the error flag is set at step 106E. If not, control passes to step 106J where it is determined whether the number of output pels is equal to 1728. If not, the line is not completed and control passes to step 106K where the coded bit stream pointer and output line pointer are updated. In this step, the coded bit stream pointer is moved to the beginning of the code following that which was just decoded. Control then passes to step 106B where the remainder of the coded bit stream is once again compared to the elements of the code table. This procedure continues until the output line is complete at which time control passes to step 106L where it is determined whether the next coded bits constitute an end of line code. If not, control again passes to step 106E where the error flag is set. If an end of line is found, control passes to step 106M where the error flag is reset to indicate that no error has been detected.

In FIG. 7, at step 108, the error flag which was either set or reset at steps 106E and 106M is queried to determine whether any errors were detected.

Referring again to FIG. 6, examples of typical errors will now be discussed.

Assume that the code in section 58 in FIG. 6 is an improper code and does not match any of the codes of the code table. In this case, an error will be detected at steps 106C and 106D of the flow chart of FIG. 8. In this case the program, as shown in FIG. 7, will return four color changes and replace the line starting with the code at section 42 through the end of the line either with white or with the previous line, depending on whether or not synchronization or lack of synchronization was previously declared.

If, for example, the final two bits of the code in section 76 are in error, the decoded line will be detected as being too long. In this case, the program of FIG. 7 will go back four color changes and replace the pels corresponding to the codes in sections 62, 66, 70 and 74 either with white or with the previous line depending on whether synchronization or lack of synchronization is indicated.

If, for example, a premature end of line is located instead of the code in section 66, the program will go back four color changes and replace the end of the line starting from the pels corresponding to the code in section 50 either with white or with the preceding line depending on the state of the synchronization.

Also, in the case of a premature end of the line code, if the premature end of the line includes a tag bit indicating a one-dimensional line, control passes to step 106 in FIG. 7 so that an attempt is made to decode the line immediately following the premature end of line code.

If, on the other hand, the premature end of line code indicates a two-dimensional code to follow, control returns to step 102 of FIG. 7 and the next end of the line code is located. In the case of FIG. 6, this would be the code in section 82.

If, during decoding, the end of fill 80 is reached and no EOL code is found, the program will count back four color changes and terminate the line using either the previous line or white starting with the pels corresponding to the code in section 66, depending on the state of the synchronization flag.

The foregoing description is set forth for purposes of illustrating the present invention but is not considered limitative thereof. Clearly, numerous additions, substitutions and other modifications can be made without departing from the scope of the invention as set forth in the appended claims.

What we claim is:

1. An apparatus for correcting errors in a line by line facsimile transmission comprising code words indicating picture elements to be produced, adjacent code words indicating differing colored groups of picture elements, said system comprising:
   means for receiving and storing at least two lines of said code words;
   means for determining the presence of an error in one of said lines of code words;
   means for counting backwards in said line containing said error a predetermined number of color changes in said picture elements to be produced; and
   means for substituting an alternative group of picture elements for picture elements corresponding to the end of said line including picture elements in said predetermined number of color changes.

2. An apparatus as set forth in claim 1 wherein said substituting means substitutes white picture elements.

3. An apparatus as set forth in claim 1 wherein said substituting means substitutes corresponding picture elements from a previous line.

4. An apparatus as set forth in claim 1 including means to determine whether the line immediately previous to the line being decoded was decoded correctly and wherein said substituting means is responsive to said determining means to substitute the corresponding portion of said immediately previous line when said immediately previous line was properly decoded and to substitute white picture elements otherwise.

5. The apparatus as set forth in claim 1 wherein said coded lines comprise one-dimensional coded lines which include codes corresponding directly to white or black picture elements, and two-dimensional coded lines which include codes that refer to picture element positions on an immediately preceding line, and wherein said determining means determines that each two-dimensional line following a one-dimensional line is improperly coded if the one-dimensional line it follows is improperly decoded until a further one-dimensional line is properly decoded.

6. A method for correcting errors in line by line facsimile transmission in which each line contains a sequence of codes in which each code represents at least one picture element and adjacent codes represent picture elements having differing colors, said method comprising:
   storing at least two successive lines of facsimile transmission, said lines comprising a line to be decoded and a previously decoded line;
   decoding said line to be decoded until an error is detected;
   defining an error portion of said line as the remainder of said line after said error is detected and a predetermined number of color changes in said line to be decoded prior to the point where said error is detected; and
   substituting an alternative set of picture elements for the picture elements corresponding to said error portion of said line.

7. A method as set forth in claim 6 including using corresponding picture elements of said previous line as said alternative set of picture elements.

8. A method as set forth in claim 6 including using white picture elements as said alternative set of picture elements.

9. A method as set forth in claim 6 including using corresponding picture elements from said previous line as said alternative set in the first erroneous line being decoded, and using white picture elements as said alternate picture elements in each erroneous line decoded after said first erroneous line which is decoded.

* * * * *